United States Patent [19]

Yamamoto

[11] 4,241,327
[45] Dec. 23, 1980

[54] DISC BRAKE PAD WEAR WARNING DEVICE

[75] Inventor: Masachika Yamamoto, Itami, Japan

[73] Assignee: Sumitomo Electric Industries, Ltd., Osaka, Japan

[21] Appl. No.: 928,022

[22] Filed: Jul. 25, 1978

[30] Foreign Application Priority Data

Jul. 25, 1977 [JP] Japan .................................. 52-89465

[51] Int. Cl.³ ............................................. B60T 17/22
[52] U.S. Cl. .................................. 340/52 A; 188/1 A; 200/61.44
[58] Field of Search ........................ 340/52 A, 52 B; 200/61.4, 61.44; 188/1 A; 116/67, 28

[56] References Cited

U.S. PATENT DOCUMENTS

| 3,611,283 | 10/1971 | Anders | 340/52 A |
| 3,882,448 | 5/1975 | Shibatani et al. | 340/52 A |

Primary Examiner—Alvin H. Waring
Attorney, Agent, or Firm—Sughrue, Rothwell, Mion, Zinn and Macpeak

[57] ABSTRACT

Brake pad backing plates are provided with protrusions at either end and a stationary member straddling the disc is provided with two sets of guide surfaces for supporting the backing plates. When the pads wear excessively, the backing plates shift toward the disc and fall into the lower set of guide surfaces to generate a warning sound either electrically or mechanically.

7 Claims, 9 Drawing Figures

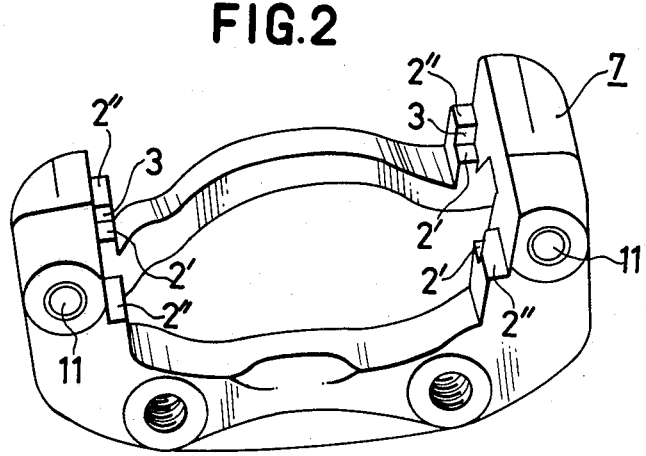
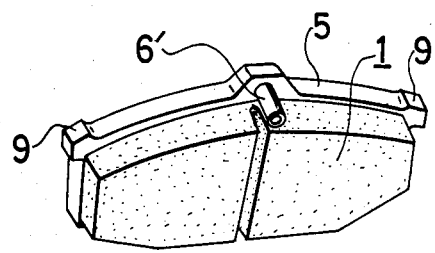
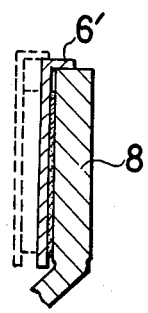

4,241,327

DISC BRAKE PAD WEAR WARNING DEVICE

BACKGROUND OF THE INVENTION

This invention relates to a device for detecting and warning the use limit of a pad in a disc brake and, more specifically to a pad wear warning device simple in construction and effective in practical use in which it is unnecessary to replace a warning unit together with the pad.

It is often desirable that the operator of a vehicle be warned of excessive brake pad wear before it reaches the point at which damage or failure of the braking system occurs. Thus, a variety of warning devices have been proposed.

In most of the conventional devices, the warning device is destroyed after it serves its purpose and must be replaced. This results in added work and expense in replacing brake pads. Even if the unit is not destroyed, it is usually provided separate from the brake pads and must be removed in order to replace the pads and replaced thereafter, thus resulting in added labor.

SUMMARY OF THE INVENTION

It is an object of this invention to provide a disc brake pad warning device which need not be replaced by a special step and which is very inexpensive.

Briefly, this is achieved by building a sound generating member into the brake pad itself and designing the brake pad holders so that the pads assume different positions under excessive wear conditions, thus bringing the sound generating member into contact with the non-braking surface area of the disc. The pad backing plates are provided with protrusions of either end which are supported in guide surfaces in a stationary member of the brake. The mechanical sound signal generating device is provided integrally with the backing plate in such a position that it is not in contact with the disc but will contact a non-braking surface area of the disc when the backing plate is moved radially inwardly. A second set of guide surfaces, lower than the first, are provided in the stationary member closer to the side surfaces of the disc so that when the pads wear, the backing plates move gradually closer to the disc until they fall onto the second set of guide surfaces and a warning sound is generated.

BRIEF DESCRIPTION OF THE DRAWINGS

The invention will now be described with reference to the accompanying drawings, in which:

FIG. 2 is a perspective view of a stationary member shown in FIG. 1;

FIG. 3 is a perspective view of a pad shown in FIG. 1;

FIG. 6 is an explanatory diagram for a description of the position of the pad with respect to the disc, where the thickness of the pad reaches its use limit, the dotted line indicating the position of the pad and backing plate before the pad thickness reaches the use limit;

DETAILED DESCRIPTION OF THE INVENTION

The invention will now be described with reference to one type of disc brake by way of example; however, it is understood that the invention is not limited thereto or thereby, and can be applied to other disc brakes also.

Figure 1:
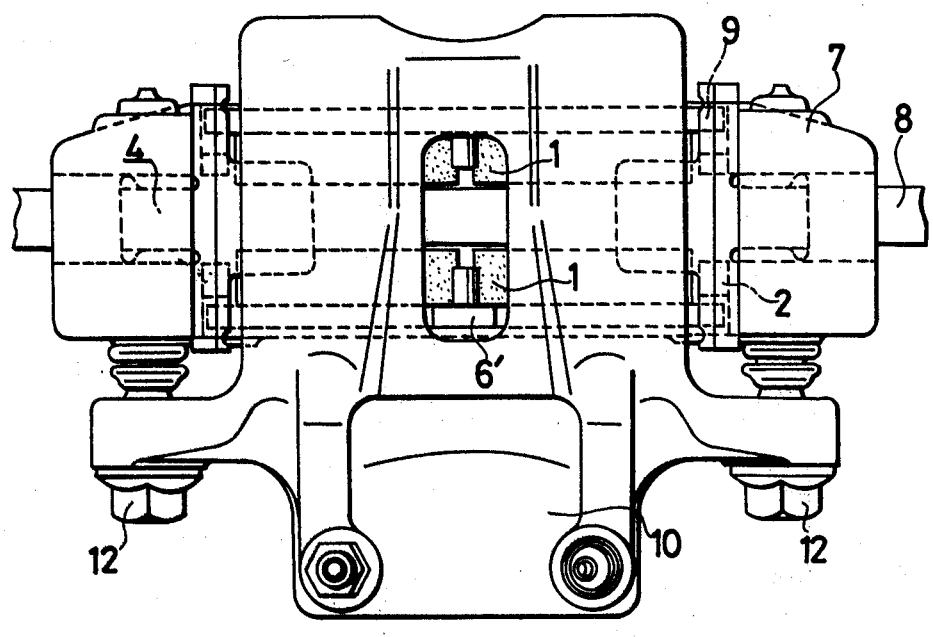
FIG. 1 is a plan view showing a disc brake to which the present invention is applied.
Figure 4:
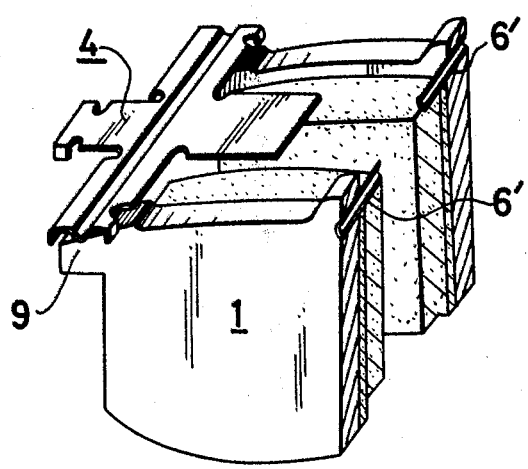
FIG. 4 is a perspective view illustrating a pad retainer.

A stationary member 7 shown in FIGS. 1 and 2 employed in a disc brake is fixedly secured to suitable stationary parts (not shown) with bolts (not shown) in such a manner that it strides over a disc 8. Two pads 1 are disposed on both sides of the disc 8. Each of the pads 1 has ears 9 provided on both end portions of a backing plate 5 as shown in FIG. 3. These ears 9 are engaged with guide surfaces 2" of the stationary member 7 while the pad is new. A pad retainer 4 shown in FIG. 4 is elastically inserted into a space formed by the stationary member 7, a caliper 10 shown in FIGS. 1 and 5, and the backing plate 5. Accordingly, the pads are slidably abutted against the guide surfaces 2". The caliper 10 is supported slidably in the disc axial direction by pins 12 which are slidably inserted into guide holes 11 in the stationary member 7. A piston 20 which is operated by a braking hydraulic pressure is provided on one arm section of the caliper so as to push one of the pads. More specifically, when one of the pads is pushed by the piston, the caliper is moved by reaction so as to abut the other pad against the other brake surface of the disc in a well known manner.

If the linings of the pads are worn out by frequent brake operations, the distance between the backing plate 5 and the braking surface of the disc is reduced. When it reaches the use limit value, the ears of the backing plate are allowed to drop onto the next guide surfaces 2' separated from the guide surfaces 2" through steps 3, respectively, as shown in FIG. 2. This movement of the backing plate is aided by the elastic force of the pad retainers 4', however, if the disc brake is installed so that the backing plates can be dropped by their own weights, then such movement can be achieved by gravity only.

Figure 5:
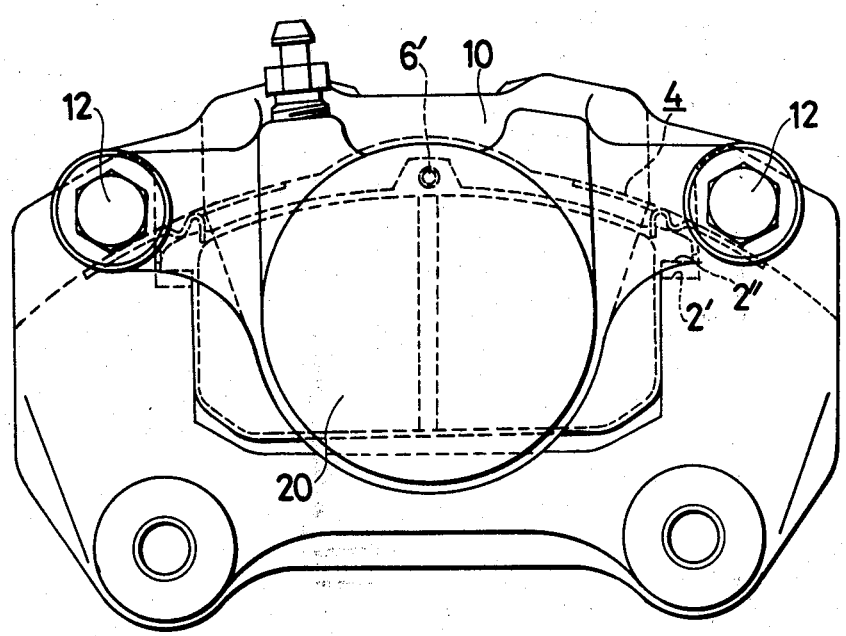
FIG. 5 is a side view showing the disc brake of FIG. 1 with the disc removed.
Figure 9:
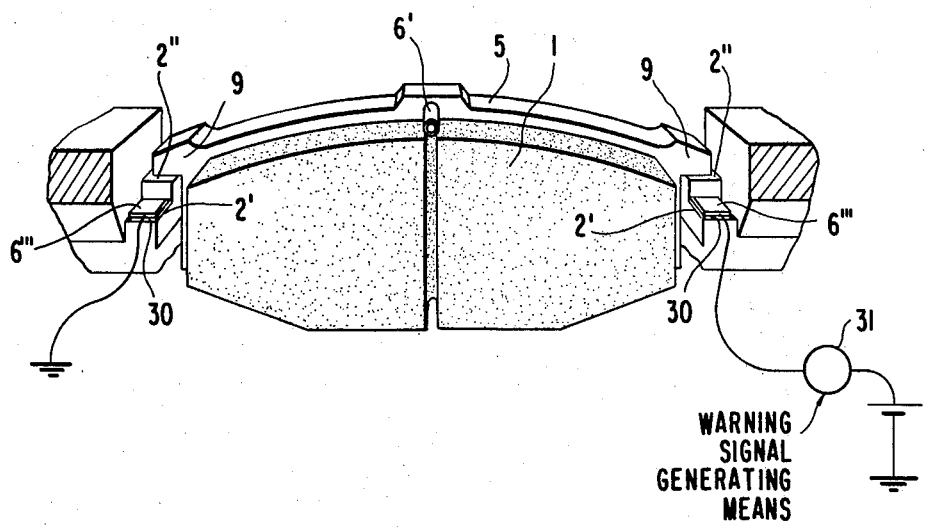
FIG. 9 is a partial cut-away view of one side of the stationary member of FIG. 2 shown in conjunction with the pad of FIG. 3, with the stationary member being modified in order to form an electrical embodiment of the present invention.

As shown in FIG. 3, a protrusion 6' is provided at the intermediate portion of the pad's backing plate 5 and, as is apparent from FIG. 5 and FIG. 6, the protrusion 6' is outside the peripheral portion of the disc (not shown), that is, it is not in contact with the disc. However, when the ears of the pad are allowed to drop onto the guide surfaces 2', the protrusion 6' is brought into contact with the outer periphery of the disc 8 as is shown in FIG. 6. Therefore, when the disc rotates, a frictional sound is generated to indicate that the pad is worn to its use limit.

Figure 7:
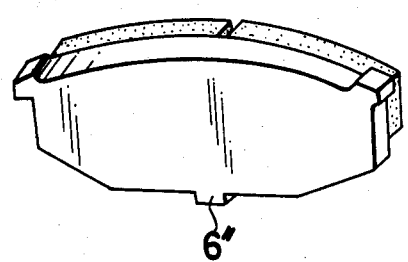
FIG. 7 is a perspective view illustrating a pad employed in another embodiment of the invention.
Figure 8:
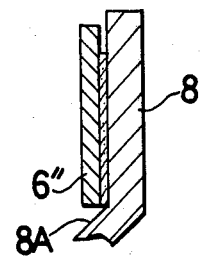
FIG. 8 is a sectional view showing the position of the pad with respect to the disc when the thickness of the pad reaches its use limit.

In a second embodiment of the invention shown in FIGS. 7 and 8, if a protrusion 6" is provided at the portion of the backing plate which is opposite to the position of the previously described protrusion 6' in the disc's radial direction, the protrusion 6", when the backing plate falls to the guide surfaces 2', is brought into contact with the base of a convex bell part 8A of the disc 8, to thereby generate a frictional, or warning sound.

As is clear from the above description, the pad wear warning device according to the invention is simple in construction and considerably effective in practical use. However, as will be apparent from the above description, various changes and modifications can be made therein without departing from the invention. For example, instead of the protrusions 6' and 6", electrical contact means 6''' may be provided on the guide surfaces 2' and insulated therefrom by insulation 30 in such a manner that the electrical contacts are closed by the ears when the pad back plate drops onto the guide surfaces 2'. The connection between the contacts 6''' will result in activation of the warning signal generating means 31, e.g., a lamp or buzzer.

What is claimed is:

1. In a pad wear warning device in a disc brake of the type in which a backing plate integral with a disc brake pad is supported on a guide surface so as to be slidable in the axial direction of the disc, and in which a a wear warning means is activated when excessive pad wear has occurred, the improvement comprising:

said guide surface having a step formed therein to divide said guide surface into first and second surfaces, the first surface being farther from said disc in the axial direction thereof and the second surface being disposed inwardly of said first surface in the radial direction of said disc, the width of said first surface in the disc axial direction being so selected that when the pad thickness reaches a predetermined value, the backing plate is caused to drop onto said second surface to cause said wear warning means to be activated.

2. A pad wear warning device according to claim 1, wherein said wear warning means is a noise signal generating means which is activated when a first surface integral with the pad backing plate contacts a second surface rotating with the disc.

3. A pad wear warning device according to claim 2, further comprising a pad retainer adapted to elastically depress said pad inwardly in a disc radial direction.

4. A pad wear warning device according to claims 2 or 3, wherein said noise signal generating means comprises a protrusion provided on said backing plate so that when said pad is dropped onto said second surface, said protrusion engages a part of said disc to thereby generate a sound.

5. A pad wear warning device according to claim 4, wherein said protrusion is provided so as to extend inwardly from said backing plate in the disc axial direction and is disposed radially outwardly of the periphery of the disc when said backing plate rests on said first surface but contacts the outer periphery of the disc when said backing plate drops to said second surface.

6. A pad wear warning device according to claim 4, wherein said protrusion is a radially inwardly projecting portion of said backing plate which contacts a bell portion of said disc when said backing plate drops onto said second surface.

7. A pad wear warning device according to claims 1 or 2, further comprising electrical switch means controlled by the dropping of said pad backing plate in a direction parallel to the plane of the disc, said wear warning device comprising an electrical means such as a lamp or buzzer which is activated in response to activation of said electrical switch means.

* * * * *